2,410,962

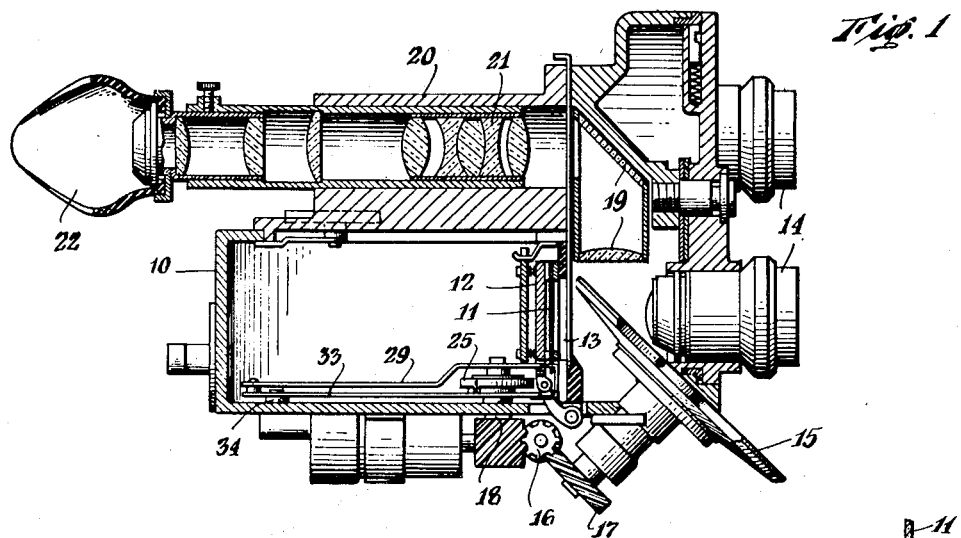
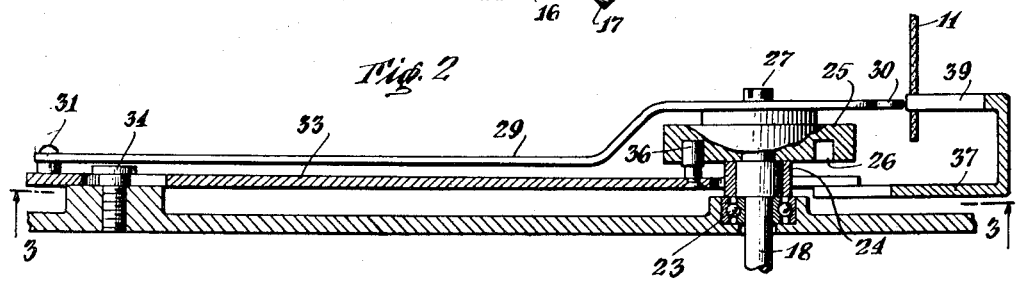
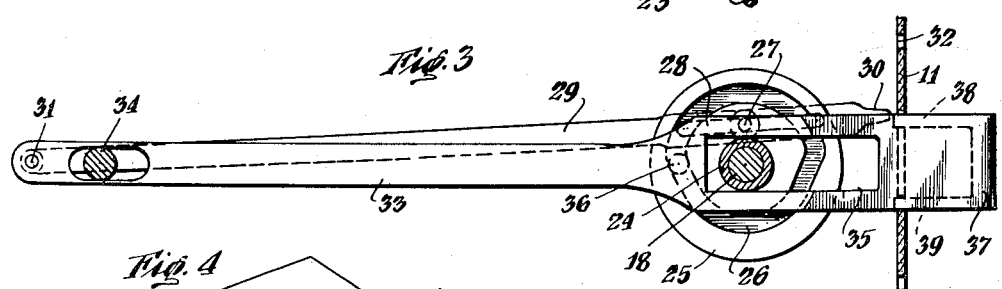
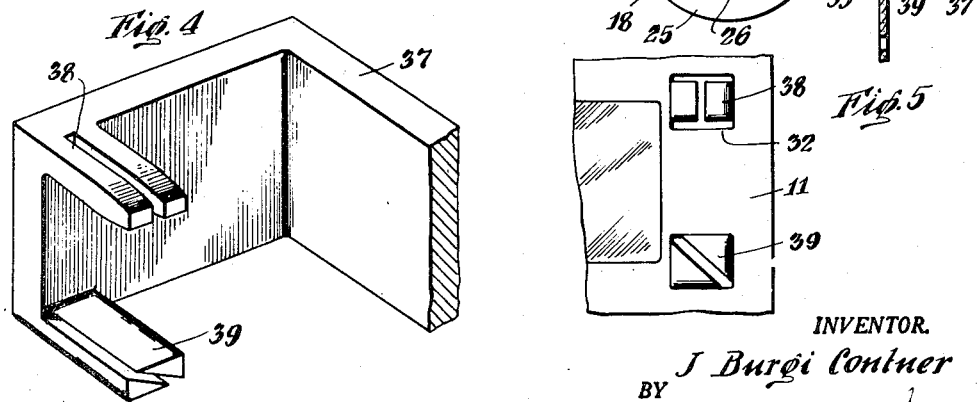
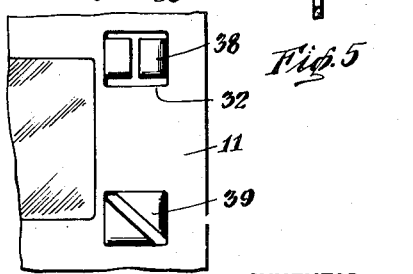
INVENTOR.
J Burgi Contner
BY
Duell, Kane & Smoot
ATTORNEYS Patented Nov. 12, 1946

UNITED STATES PATENT OFFICE 2,410,962

FILM-FEEDING MECHANISM

J Burgi Contner, New York, N. Y.

Application April 13, 1944, Serial No. 530,824

7 Claims. (Cl. 88—18.4)

This invention relates to a structurally and functionally improved film-feeding mechanism and in its more specific aspects aims to provide such a mechanism primarily intended for use in motion picture cameras, projectors and similar types of units.

It is an object of the invention to furnish a mechanism of this type and which will operate to properly feed and register frames or desired portions of a film or its equivalent with portions or units of a mechanism through which the film is fed. Accordingly, the difficulties heretofore encountered in this connection and especially as a consequence of the twisting and shrinking tendencies of acetate film are avoided.

A further object of the invention is that of providing a mechanism which will not alone function with entire satisfaction despite any shrinkage which may have occurred in the length of the film but will also operate in a satisfactory manner despite the fact that the sprocket holes of the film may have shrunk or otherwise become distorted.

An additional object is that of furnishing a film-feeding mechanism which will embody relatively few parts, each individually simple and rugged in construction, these parts being capable of ready manufacture and assemblage and when so assembled operating over long periods of time with freedom from all difficulties.

Moreover, by means of the present invention, a feeding mechanism is furnished which may be substituted for an equivalent mechanism in an assembly as heretofore constructed; such substitution serving to overcome the difficulties inherent to the original mechanisms.

With the foregoing and other objects in mind, reference is had to the attached sheet of drawings illustrating practical embodiments of the invention, and in which:

Fig. 1 is a sectional plan view taken through a camera and showing the improved feeding mechanism in association therewith;

Fig. 2 is a sectional plan view in enlarged scale of that mechanism;

Fig. 3 is a sectional side view taken along the lines 3—3 and in the direction of the arrows as indicated in Fig. 2;

Fig. 4 is a perspective view showing in enlarged scale a portion of the mechanism illustrated in the foregoing figures; and Fig. 5 is a face view of certain of the parts as shown in Fig. 4.

While in the illustrated embodiments the invention has been shown in association with a motion picture camera and especially a camera employing 16-millimeter film, it is primarily to be understood that the present invention may be employed to feed films of other sizes not alone in a camera structure but also, for example, in a projector assembly. As will be obvious, the present mechanism may be used in conjunction with optical printers and similar mechanisms. With the foregoing in mind, the illustrated combination and certain portions of the following specification are to be regarded in an illustrative rather than in a limiting sense.

Thus, referring to Fig. 1, it will be seen that the reference numeral 10 indicates a casing providing a light-proof enclosure through which a film 11 to be exposed is fed. This film moves in guiding relationship with respect to a gate 12 disposed adjacent an aperture 13. One of a series of lenses 14 may be disposed in operative relationship with respect to this aperture. A shutter 15 is interposed between the selected lens and the aperture 13 to periodically interrupt and permit the passage of light rays through the aperture.

The shutter 15 is—as illustrated—of the rotary type and is driven, for example, by a shaft 16 mounting a gear, the teeth of which mesh with a gear 17 secured to the shutter-mounting shaft. The drive shaft 16 also serves in any suitable manner to effect rotation of the shaft 18. The latter, as hereinafter described, operates the film-feeding mechanism. It will also be observed that the shaft 16 may serve to operate additional elements or accessories; the lay-out of these several parts having been illustrated and described in detail in the parent application heretofore referred to.

Also, as described in that application, portions of the shutter 15 may provide reflective surfaces. Consequently, light rays passing through the lens assembly 14 and striking against these surfaces will be reflected through a suitable lens and mirror assembly 19. Thence, they will be reflected through a tubular extension 20 which may form a part of the casing. Within this extension a lens assembly 21 may be disposed. This assembly terminates conveniently in an eyepiece 22. Thus, as has been brought out in the earlier application, an operator may employ this assembly as a finder and observe precisely the image which is being received upon the sensitive film 11.

As afore brought out, the invention, while in many respects of a special utility when employed in connection with a camera or projector of the moving picture type will be of equal value in association with various other types of apparatus which require the precise feeding and positioning of a strip of material such as a film. Therefore, the heretofore described embodiment is to be regarded merely as illustrative and depicting a preferred association of the invention. Likewise, the gearing and operating mechanism may, in that particular association or any other to which the present invention has application, be modified in any desired manner. However, it will be noted that by virtue of the aperture 13 there is incorporated in the present illustration a zone or position which may be defined as a station. It is with respect to this station that the film or other strip is to be precisely positioned and irrespective of the pecularities and characteristics of that strip.

With the foregoing in mind, attention is now directed to Figs. 2 and 3. In these views, the reference numeral 18 again indicates a shaft which is rotated by a suitable operating mechanism. This shaft may be supported by an antifrictional bearing 23. Conveniently encircling the shaft 18 is a bushing 24. Beyond this element the shaft mounts a rotary member 25 conveniently formed with a cam track 26. The member or disc 25 mounts a crank which may be in the form of a headed pin 27, the shank of which extends through a slot 28 formed in a pull-down arm or lever 29. The forward end of this arm terminates in an aperture-engaging tooth or projection 30. The rear end of the arm is rockingly supported by means of a pivot 31.

Thus, it is obvious that as the shaft 18 rotates the arm or lever 29 will be oscillated to correspondingly shift the tooth or projection 30. With the latter element engaging a feed perforation 32 in the film 11, it is apparent that the strip will be shifted so that for example one frame will be moved from the station as defined by the aperture 13 and be displaced a distance such that it will be beyond the light rays thereafter entering the aperture. At the same time, a second frame portion will be registered with this aperture station. It is obvious that thereupon the tooth should be disengaged from the edges of the film-feed opening and caused to engage a second or successive opening of this type.

In order to achieve this result, it will be observed that the pivot 31 extends from a bar 33. A pin and slot connection 34 serves to support the bar 33 for reciprocation adjacent one of its ends. The bar is formed with a slot 35 adjacent its opposite end and this slot conveniently frames or encircles the bushing 24. A pin or follower 36 rides within the cam track 26 and is secured to the bar 33. Accordingly, as the shaft 18 rotates, it is obvious that, in addition to oscillating the arm 29, the bar 33 is reciprocated. This bar being connected to that arm by means of the pivot 31 reciprocation will also be imparted to that arm. Therefore, the outer end of the latter will have a cycle of movement as follows:

The tooth 30 will be projected into the film-feed opening 32 of the film or equivalent strip 11. Such strip is at that moment stationary. According to the direction of rotation of the shaft 18, the end portion 30 will now either be elevated or depressed carrying with it the film strip. According to the embodiment under consideration, the shaft 18 as viewed in Figs. 2 and 3 is rotating in a clockwise direction. Therefore, after the tooth or projecting portion 30 has engaged the film opening, the strip 11 will be moved downwardly. After the arm 29 has been depressed to the limit of its movement, the bar 33 will be retracted thereby withdrawing the projection 30 from the feed opening. Thereupon, the arm 29 will be shifted upwardly to the limit of its movement. When this has occurred, the bar 30 will again be projected to correspondingly move the arm 29 and cause the projection or tooth 30 to enter the next opening in the film or strip. This cycle will be repeated as frequently as the shaft 18 revolves.

At this time, it is to be understood that, while in many respects it is preferred to employ precisely the form of actuating mechanism illustrated and heretofore described in order to impart to the bar and arm the desired movement, any proper and substitute mechanism might be utilized. Also, while as illustrated, the bar engages only the successive apertures of a single row of feeding perforations, the structures might be modified in order to assure the proper engagement of any desired number of rows of apertures as would be employed, for example, in 35-millimeter or larger film or strips.

As will be readily appreciated by those conversant with this art, considerable difficulty has been experienced in using an acetate film base due to the tendency of the latter to twist and shrink to a greater degree than in the case of a nitrate film base. It has been customary to dispose the feeding mechanism and especially the film or strip-engaging portions thereof at a point above or below the station defining the exposure or projection aperture. Thus, any tendency of the film to distort or shrink has resulted in faulty registration adjacent this station; the greater the distance between the film-feeding and engaging mechanism and that station, the greater the resultant error. As will be observed, it is preferred—according to the teachings of the present invention—to locate the film-engaging and -feeding mechanism immediately adjacent or within the zone of this station, thereby reducing the difficulties as heretofore experienced.

The difficulties with respect to improper registration are substantially completely overcome by virtue of the fact that a film or strip registration mechanism is employed and which assures a proper disposition of the film with respect to the station or zone which it is to occupy. This mechanism is preferably operated by means of the bar 33 and includes, as shown, an extension 37 projecting to one side of and beyond the strip 11. This extension is bent upon itself to provide what might be termed a hook portion terminating in pins 38 and 39. These pins are spaced a distance preferably equal to the spacing of the film-feed openings 32 in the strip 11. Also, these pins are conveniently located adjacent the upper and lower respective ends of the station.

Being mounted by the bar 33 they have a reciprocatory movement imparted to them. Also, it will be noted that they engage the film or strip 11 as the latter is freed from engagement of the tooth or projection 30. Therefore, when the film is not moving, these pins assure against any accidental shifting of that film in addition to registering its body perfectly with respect to the station.

As shown especially in Figs. 4 and 5, the upper registration pin 38 is of a width substantially equal to that of the perforation or film openings 32. It is of less height than the normal height of that aperture. As also shown in these views, it is preferably slotted in a vertical direction. Therefore, even if the sprocket opening has shrunk in width, this registration pin will be capable of penetrating the aperture without fracturing the edges thereof. The lower registration pin 39 is of a height and width such that it is normally equal in dimensions to the dimensions of the feeding openings. In view of the fact that this pin is engaging the same opening which has theretofore been successively engaged by the pin 38 and the tooth or projection 30, no difficulties will be experienced incident to improper framing of the film area or frame and irrespective of any film shrinkage which may have occurred. Additionally, the lower pin 39 may be slotted diagonally. Therefore, it will be sufficiently flexible to automatically compensate for both vertical and horizontal shrinkage if aperture shrinkage has occurred. Of course, neither the pin 38 or 39 need be slotted nor need they be slotted in the particular manners shown in the drawing. For general purposes, however, I have found that these types of construction are preferable.

Thus, among others, the several objects of the invention as specifically aforenoted are achieved. Obviously, numerous changes in construction and rearrangements of the parts might be resorted to without departing from the spirit of the invention as defined by the claims.

I claim:

1. In a motion picture apparatus, a film-feeding mechanism including a slidably mounted bar, film-retaining means extending from said bar, a rocking arm pivotally supported by said bar and presenting at its end a film-engaging and shifting portion, a cam and crank portion rotatably supported with reference to said bar and arm, means for coupling said bar with said cam portion to impart to the bar and film-retaining means a purely reciprocatory movement, and means for operatively coupling said rockingly mounted arm with respect to said crank portion to cause said film-engaging portion to move in substantial immediate proximity to said film-retaining means and whereby, as said film-engaging portion is retracted from a perforation of the film, the film-retaining means carried by said bar is caused to project into said perforation.

2. A mechanism for feeding a strip formed with perforations past a display aperture, said mechanism including in combination a member, operating means for projecting said member into a strip perforation disposed adjacent said station, thereupon shifting said member to one side to correspondingly move said strip past said aperture and thereafter retracting said member from the perforation, and strip engaging means including a pair of pins located adjacent opposite ends of said aperture, one of said pins being projectable into said perforation substantially simultaneously with the withdrawal therefrom of said member; the other of said pins being disposable in a perforation of said strip about to be engaged by said member.

3. A mechanism for feeding a strip formed with perforations past a display aperture, said mechanism including in combination a member, operating means for projecting said member into a strip perforation disposed adjacent said station, thereupon shifting said member to one side to correspondingly move said strip past said aperture and thereafter retracting said member from the perforation, and strip engaging means including a pair of pins located adjacent opposite ends of said aperture, one of said pins being projectable into said perforation substantially simultaneously with the withdrawal therefrom of said member, the other of said pins being disposable in a perforation of said strip about to be engaged by said member; and one of said pins being of less height than the normal height of the perforation to receive the same.

4. A mechanism for feeding a strip formed with perforations past a display aperture, said mechanism including in combination a member, operating means for projecting said member into a strip perforation disposed adjacent said station, thereupon shifting said member to one side to correspondingly move said strip past said aperture and thereafter retracting said member from the perforation, and strip-engaging means including a pair of pins located adjacent opposite ends of said aperture, one of said pins being projectable into said perforation substantially simultaneously with the withdrawal therefrom of said member, the other of said pins being disposable in a perforation of said strip about to be engaged by said member; and means whereby said pins incorporate a yieldingly flexible structure.

5. A mechanism for feeding a strip formed with perforations past a display aperture, said mechanism including in combination a member, operating means for projecting said member into a strip perforation disposed adjacent said station, thereupon shifting said member to one side to correspondingly move said strip past said aperture and thereafter retracting said member from the perforation, and strip engaging means including a pair of pins located adjacent opposite ends of said aperture, one of said pins being projectable into said perforation substantially simultaneously with the withdrawal therefrom of said member, the other of said pins being simultaneously disposable in a perforation of said strip about to be engaged by said member; one of said pins being of less area than the normal area of the perforation through which it is to project, the other of the same presenting side faces of substantially the same area as the normal perforation area.

6. A mechanism for feeding a strip formed with perforations past a display aperture, said mechanism including in combination a member, operating means for projecting said member into a strip perforation disposed adjacent said station, thereupon shifting said member to one side to correspondingly move said strip past said aperture and thereafter retracting said member from the perforation, and strip engaging means including a pair of pins located adjacent opposite ends of said aperture, one of said pins being projectable into said perforation substantially simultaneously with the withdrawal therefrom of said member, the other of said pins being disposable in a perforation of said strip about to be engaged by said member; one of said pins being transversely slotted and the other of the same being diagonally slotted whereby the bodies of said pins are rendered flexible.

7. A motion picture apparatus including a casing formed with an aperture adjacent which a perforated strip is to be moved, a mechanism mounted by said casing for so moving said strip, said mechanism comprising a pair of pins, means for mounting said pins whereby one of the same is disposed adjacent one end of the aperture and the other of the same is disposed adjacent the opposite end thereof, means for shifting said mounting means to cause said pins to enter adjacent strip perforations in registration therewith and to be retracted from said perforations, a strip-shifting member, means for supporting the same to have movement in the zone between said pins, and means for causing said shifting member to enter one of the perforations of the strip substantially simultaneously with the vacating of said perforation by one of said pins, to shift the adjacent zone of said strip past said aperture and to retract from said perforation substantially simultaneously with the latter's being entered by the second of said pair of pins.

J BURGI CONTNER.